Dec. 23, 1941. W. J. LUTEY 2,267,242
RESILIENT CROSS BAND FOR PNEUMATIC TIRES
Filed Jan. 24, 1939
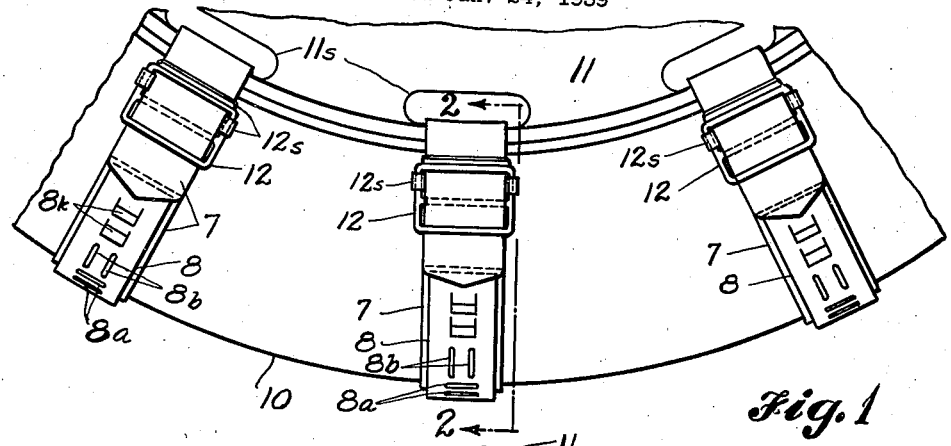
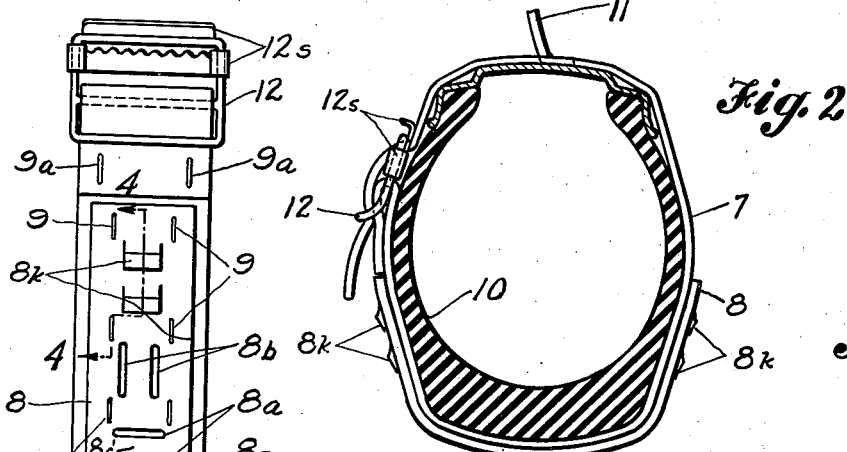
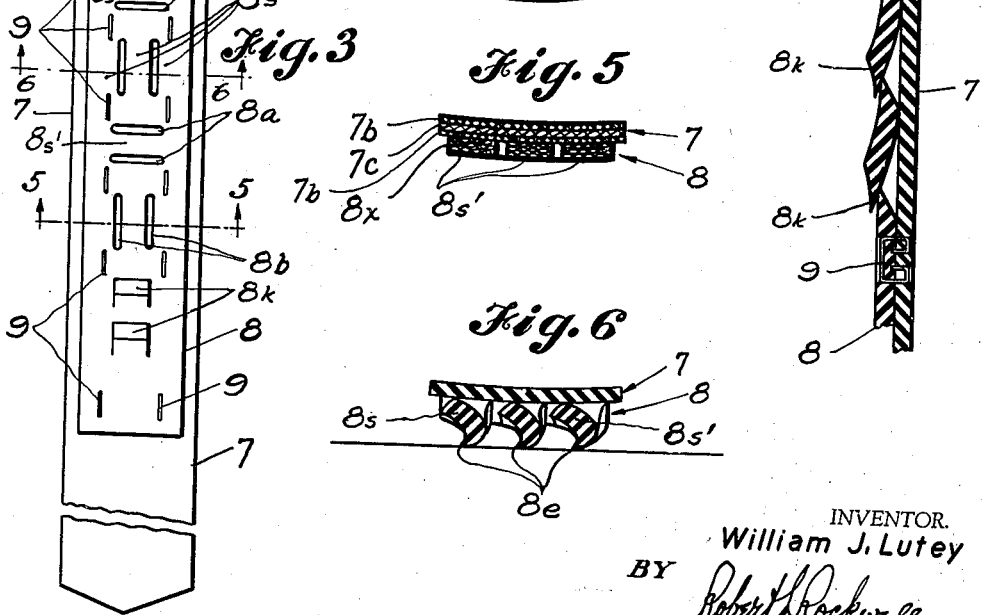
INVENTOR.
William J. Lutey
BY Robert L. Rockwell
ATTORNEY.

Patented Dec. 23, 1941

2,267,242

UNITED STATES PATENT OFFICE 2,267,242

RESILIENT CROSS BAND FOR PNEUMATIC TIRES

William J. Lutey, Seattle, Wash.

Application January 24, 1939, Serial No. 252,576

10 Claims. (Cl. 152—221)

This invention relates to improvements in cross bands for pneumatic tires in general, and in particular to said cross bands made in a novel manner from inexpensive resilient material to impart special non-slip characteristics to said tires with a minimum of vibration to the vehicle.

The preferred embodiment of the invention herein disclosed is characterized particularly by the construction and mounting of an outerband of active resilient material, which may be cut circumferentially from discarded tire casings so the cord plies thereof are disposed at angles of substantially 45 degrees with its longitudinal axis, thereby assuring both low production cost and a maximum of resiliency. The inner or backing strap, however, preferably is cut diagonally from discarded large tires to provide alternate layers of cord plies that are parallel with the axis of the strap to reduce the amount of stretch in this member to a minimum. The outer band may be secured to the backing strap by "stitching" with a plurality of heavy clinched wire staples. Groups of longitudinal and transverse slots in said outer band, together with certain peculiar characteristics of the resilient material itself, are relied upon to prevent the longitudinal and transverse skidding of the wheels equipped with the invention.

The equipment for each wheel to be protected against slipping by my cross bands may consist of a plurality of spaced apart cross bands so installed as to encircle the tire of said wheel, as shown in Figs. 1 and 2 of the drawing. Their installation and removal are facilitated by means of a suitable buckle fixedly secured, as by stapling, to the short end of the inner or backing strap of each cross band, the other or longer end thereof being adapted to be secured by said buckle after passing through slots provided therefor in disk-type wheels, or between the spokes of spoked wheels.

When the wheels of a vehicle are equipped properly with a set of my cross bands, I find that when the brakes are applied suddenly, or when the vehicle is quickly accelerated or decelerated, the strips of material on either side of and between the groups of longitudinal slots cut in each of the resilient outer bands tend to twist, and under severe conditions actually do twist, about their longitudinal axes to bring into play the edge portions thereof to greatly enhance the non-skid features of the cross bands particularly in the direction of longitudinal motion of the vehicle. Similarly the transverse slots in said outer bands make available a plurality of strips which are adapted to twist in like manner, thereby making their edges available to resist side skidding when the vehicle is negotiating turns.

Near each end of the aforesaid outer band a plurality of pushed-through finger-like projections may be provided to assist the aforesaid strips under unusual road and skidding conditions.

The backing strap preferably is made wider than the outer band to provide a graduated thickness, over which the wheel rolls with much less vibration than when both strap and band are made the same width.

An object of the invention is to provide an article of the kind described in which the band of material comprising the outer portion of said article when installed upon a wheel, is provided with a novel arrangement of apertures that permit the resilient strips formed thereby to twist and bring into play a plurality of sharp edges and normally unused portions of the material to prevent skidding of said wheel.

Another object is to provide an improved cross band to prevent the skidding of a pneumatic tire, in which the backing strap is continuous throughout its length and is provided with means for removably securing said cross band about said tire.

A further object is to provide an improved cross band of the kind described that is graduated in thickness at its side edges by fixedly securing an outer band to a backing strap of greater width.

A still further object is to provide an improved cross band that may be made easily and quickly from inexpensive materials as a cheap yet effective substitute for the metal chain-type of cross strap.

Other objects and advantages will be apparent to those skilled in the art from the following detailed description of a preferred form of the invention, which consists of certain parts in cooperative combination hereinafter described, illustrated in the accompanying drawing and embraced in the appended claims.

In the drawing:

Figure 1 is a fragmentary side elevation of a disk-type wheel equipped with the cross band of my invention;

Fig. 2 is a sectional elevation taken on broken line 2—2 of Fig. 1 to a larger scale, showing a cross band in position upon the tire;

Fig. 3 is a plan view of the cross band to the same scale as in Fig. 2, as it would appear when laid upon a flat surface;

Fig. 4 is a fragmentary longitudinal section through the cross band taken on broken line 4—4 of Fig. 3 to a still larger scale;

Fig. 5 is a cross section taken on broken line 5—5 of Fig. 3 to the same scale as in Fig. 4, to show the arrangement of parts and the disposition of the cord elements comprising the strap and band elements;

Fig. 6 is a cross section taken at broken line 6—6 of Fig. 3, similar to that taken on broken line 5—5 and to the same scale, but showing the twisting of the longitudinal strips of the outer band element, thereby bringing the edge portions thereof into engagement with the road surface to increase the resistance to skidding.

Like reference numerals are used to indicate like parts throughout the several figures of the drawing, wherein backing strap 7 and perforated outer band element 8 are shown "stitched" together by means of a plurality of well clinched heavy wire staples 9, which fixedly secure said band element to the backing strap at points intermediate of slot apertures 8a and 8b, and between apertures 8b and out-turned fingers 8k cut in the band element, thus allowing the edges of said fingers and of strips 8s and 8s' formed by said apertures to function freely as hereinafter explained. Any suitable means may be employed to fixedly secure one end of the backing strap to the other, after the cross band has been wrapped around the tire 10 and the longer end of the backing strap passed through a slot aperture 11s provided in the disk portion 11 of the wheel on which said tire is mounted. I find, however, that a buckle 12 of standard manufacture, regularly used for the fastening of heavy woven or leather straps, is suitable for this purpose because of the ease with which the cross straps may be fastened when installing them in place on the tire, or to loosen them when their removal is desired. Said buckle may be secured to the shorter end of said backing strap by fixedly securing the bent-back portion to the main portion thereof by means of well clinched heavy wire staples 9a.

Backing strap 7 may be made of hard canvas belting or of other material of like nature adapted to resist stretching longitudinally when subjected to heavy tension loads. I have found that straps cut from the first three plies of large cord truck tires are an inexpensive and acceptable substitute for the expensive aforesaid belting, providing the first three plies are cut to form the strap with the cuts running parallel with the cords of the first and third plies. Such cuts usually will be at approximately 45 degrees with the circumferential center line of the tire casing from which the straps are cut. It is found that the first and third layers of cords running longitudinally of said straps provide effective means for reducing the stretching of the material, thereby assuring a continual snug fit of the cross band around the tire, when once properly installed by pulling the longer end of the backing strap through the buckle with as much force as practicable and then fastening the locking slide 12s of the buckle. Best results are obtained when the cross strap is thus firmly held in contact with the tire casing, as illustrated in Figs. 1 and 2.

The outer band element preferably is made of a more resilient material than the backing strap. I have found that the said band elements may be cut from worn tire casings, with the cuts running parallel with the circumferential center line of said casings, care being taken to provide a substantial thickness of the tread rubber to provide an outer wear surface for the band straps. It will be understood that, when said outer bands thus are cut from the tire casing, the cords forming the several plies thereof will lie at substantially 45 degrees with the longitudinal center of the band.

The cross section through the cross band shown in Fig. 5 is illustrative of the disposition of the cord elements in the several plies of both the backing strap and outer band in accordance with the foregoing description, wherein 7b are the plies composed of cords running lengthwise of strap 7, and 7c is the ply made up of cords substantially at right angles thereto. Similarly 8x indicates the plies made up of cords running across outer band 8 at approximately 45 degrees.

Where the cross bands are to be subjected to unusually heavy duty service, both said backing strap and said outer band may be cut to provide a plurality of cord layer plies comprised of cord elements running lengthwise of the material. It is found that three plies usually are sufficient for both the backing strap and the outer band, except for heavier vehicles, such as trucks and buses.

Prior to securing the outer band to the backing strap as hereinbefore described, said outer band is provided with a plurality of substantially parallel slot apertures 8b extending lengthwise of said band and arranged to form a number of groups of slots. Said groups of lengthwise slots preferably alternate with other groups of substantially parallel slot apertures 8a disposed transversely of said band, as shown clearly in Fig. 3, wherein it will be seen that said slot apertures form a plurality of strips 8s and 8s'. Near either end of each outer band a plurality of pushed-through finger-like projections 8k may be provided by means of a special tool that will cut through the material at a sharp angle with the plane thereof. The rectangular fingers thus formed and pushed through their respective apertures being prevented from returning to their former positions, are so disposed as to assist the other elements of the outer band in preventing skidding, as hereinafter more fully described.

With the completed cross band securely fastened about the tire as illustrated in Fig. 2, when the vehicle of which said tire is a part is quickly accelerated or decelerated, the strips of resilient material 8s on either side of and between longitudinal slots 8b tend to twist, and under severe conditions actually do twist, about their longitudinal axes to bring into play edge portion 8e. These greatly increase the resistance to skidding in the direction of motion responsible for said twisting of the strips when the cross band is in contact with the road. This is particularly true when the direction of motion is longitudinally of the vehicle, due to the relatively large number of strips that then become effective to prevent skidding, as illustrated in Fig. 6.

Likewise, transverse slots 8a make available a plurality of strips 8s' that are adapted to twist and make available their edges to resist the skidding of the wheel sidewise, as when the vehicle is negotiating turns.

It is desirable that wire staples 9 be so disposed relative to strips 8s and 8s' that they do not interfere with the aforesaid twisting of said strips as this is an important feature of the invention.

Finger-like projections 8k obviously become particularly effective in deep snow, loose sand and mud in aiding the other elements of the outer band to prevent skidding. They may be effective also when the cross bands are used in connection with low-pressure tires that deform considerably when the vehicle is caused to negotiate sharp turns at high rates of speed, thereby bringing said projections into contact with the road.

The outer band portion of the cross strap preferably is made narrower than the backing strap, as shown clearly in Figs. 5 and 6. When thus constructed, less vibration is imparted to the vehicle as the tire rolls over the cross strap in contact with the road than when said outer band and backing strap are the same, or nearly the same, in width.

From the drawing and foregoing description it will be apparent to those skilled in the art, that the essential coacting elements comprising the invention may be constructed and combined in various other equivalent forms, and may be made from other materials and for other uses, without departing from the purpose and intent of the invention within the scope of the appended claims.

For example, although I have illustrated and described my invention in terms of a so-called cross band which is adapted to encircle the tire to be protected, it will be understood that the combination of the active portions of the coacting elements, defined as backing strap and outer band, may be used as substitutes for the cross links of what are known in the art as tire chains. Furthermore, while I have illustrated the slot apertures disposed either longitudinally or transversely of the outer band, it will be understood that apertures of other shapes may be used, and that said apertures may be differently disposed and arranged.

Having illustrated and described a preferred form of my invention, what I claim as new and desire to protect by Letters Patent is:

1. A cross band for pneumatic tires comprising a flexible backing strap, an outer band element of resilient material narrower than said backing strap and perforated with a plurality of apertures, and means for fixedly securing said strap and band together.

2. A cross band for pneumatic tires comprising a flexible backing strap element, an outer band element of resilient material perforated with a plurality of slot apertures, and means for fixedly securing said strap and band together.

3. A cross band for pneumatic tires comprising a flexible backing strap element, an outer band element of resilient material perforated with a plurality of longitudinally disposed slot apertures to form a plurality of longitudinal strips adapted to twist and thereby increase the resistance to skidding, and means for fixedly securing said backing strap and outer band together.

4. A cross band for pneumatic tires comprising a flexible backing strap element, an outer band element of resilient material perforated with a plurality of transversely disposed slot apertures to form a plurality of transverse strips adapted to twist and thereby increase the resistance to skidding, and means for fixedly securing said backing strap and outer band together.

5. A cross band for pneumatic tires comprising a flexible backing strap element, an outer band element of resilient material perforated with a plurality of groups of substantially parallel longitudinal slot apertures disposed alternately with other groups of substantially parallel transverse slot apertures, and means for fixedly securing said strap and band elements together.

6. In a cross band for pneumatic tires, the combination of a backing strap of flexible material, an outer band element of resilient material perforated with a plurality of groups of substantially parallel longitudinal slot apertures disposed alternately with a plurality of groups of substantially parallel transverse slot apertures, and means for fastening said backing strap and outer band together.

7. In a cross band for pneumatic tires, the combination of a backing strap adapted to resist stretching longitudinally, an outer band element of resilient material narrower than said backing strap and perforated with a plurality of groups of substantially longitudinal slot apertures disposed alternately with a plurality of groups of substantially parallel transverse slot apertures, and means for fastening said backing strap and outer band together.

8. In a cross band for pneumatic tires, the combination of a backing strap adapted to resist stretching longitudinally, an outer band element of resilient material perforated with a plurality of groups of substantially parallel longitudinal slot apertures disposed alternately with a plurality of groups of substantially parallel transverse slot apertures, a plurality of pushed-through finger-like projections disposed adjacent the end groups of said slot apertures, and means for fastening said backing strap and outer band together.

9. In a cross band for a pneumatic tire, the combination of a backing strap of flexible material adapted to resist stretching longitudinally, an outer band element of resilient material narrower than said backing strap and perforated with a plurality of groups of substantially parallel longitudinal slot apertures disposed alternately with a plurality of groups of substantially parallel transverse slot apertures, a plurality of pushed-through finger-like projections disposed adjacent the end groups of said slot apertures, means for fastening said backing strap and outer band together, and means for tightening and removably securing said backing strap about said pneumatic tire.

10. In a cross band for a pneumatic tire, the combination of a backing strap of flexible material adapted to resist stretching longitudinally, an outer band element of resilient material narrower than said backing strap and perforated with a plurality of groups of substantially parallel longitudinal slot apertures disposed alternately with a plurality of groups of substantially parallel transverse slot apertures, a plurality of pushed-through finger-like projections disposed adjacent the end groups of said slot apertures, metallic means for fastening said backing strap and outer band together, and buckle means for tightening and removably securing said backing strap about said pneumatic tire.

WILLIAM J. LUTEY.